(12) United States Patent
Sharifi et al.

(10) Patent No.: US 10,346,223 B1
(45) Date of Patent: Jul. 9, 2019

(54) SELECTIVE OBFUSCATION OF NOTIFICATIONS

(71) Applicant: Google LLC, Mountain View, CA (US)

(72) Inventors: Matthew Sharifi, Mountain View, CA (US); Jakob Foerster, Mounain View, CA (US)

(73) Assignee: Google LLC, Mountain View, CA (US)

( * ) Notice: Subject to any disclaimer, the term of this patent is extended or adjusted under 35 U.S.C. 154(b) by 139 days.

(21) Appl. No.: 15/360,528

(22) Filed: Nov. 23, 2016

(51) Int. Cl.
*G06F 9/54* (2006.01)
*G06F 21/62* (2013.01)

(52) U.S. Cl.
CPC .......... *G06F 9/542* (2013.01); *G06F 21/6254* (2013.01); *H04L 2209/16* (2013.01)

(58) Field of Classification Search
None
See application file for complete search history.

(56) References Cited

U.S. PATENT DOCUMENTS

| | | |
|---|---|---|
| 8,136,053 B1 | 3/2012 | Miller et al. |
| 2010/0146384 A1 | 6/2010 | Peev et al. |
| 2011/0206285 A1* | 8/2011 | Hodge .................... G06F 21/84 382/224 |
| 2013/0117830 A1* | 5/2013 | Erickson ............. H04L 63/0428 726/6 |
| 2014/0256288 A1 | 9/2014 | Allen |
| 2014/0258937 A1* | 9/2014 | Lee ........................ G06F 3/0482 715/835 |
| 2015/0074615 A1 | 3/2015 | Han et al. |
| 2016/0034424 A1 | 2/2016 | Won |
| 2016/0034695 A1 | 2/2016 | Won et al. |
| 2016/0334765 A1* | 11/2016 | Duca .................. G05B 19/4186 |
| 2016/0335275 A1* | 11/2016 | Williams .......... G06F 17/30091 |
| 2017/0353423 A1* | 12/2017 | Morrison ................ H04L 51/32 |

OTHER PUBLICATIONS

International Searching Authority, International Search Report and Written Opinion dated Mar. 28, 2018, issued in connection with International Patent Application No. PCT/US2017/063186, filed Nov. 24, 2017, 15 pages.

* cited by examiner

*Primary Examiner* — Tuan C Dao
(74) *Attorney, Agent, or Firm* — McDonnell Boehnen Hulbert & Berghoff LLP

(57) ABSTRACT

Methods and systems may help to provide filtered notification content that provides useful information to the intended recipient, but does not provide the same information to an unauthorized viewer. To do so, when an application event occurs, filtered notification content may be generated. The filtered notification content may combine a non-obfuscated portion of the event content and an obfuscated portion of the event content, such that when viewed by an intended recipient, the filtered notification content provides implicit information that the device expects the particular user to understand based on the user's own experience and/or other factors.

21 Claims, 7 Drawing Sheets

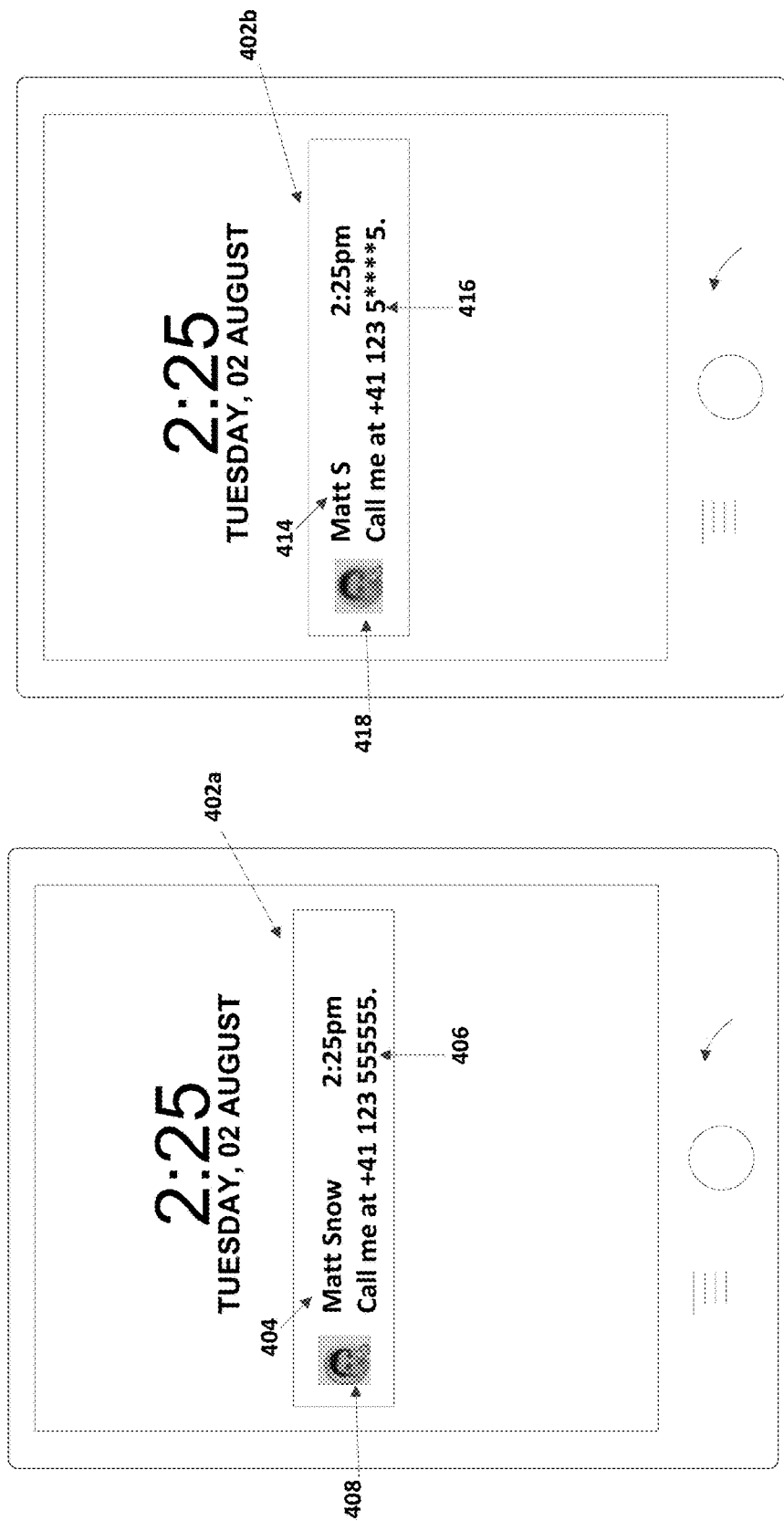

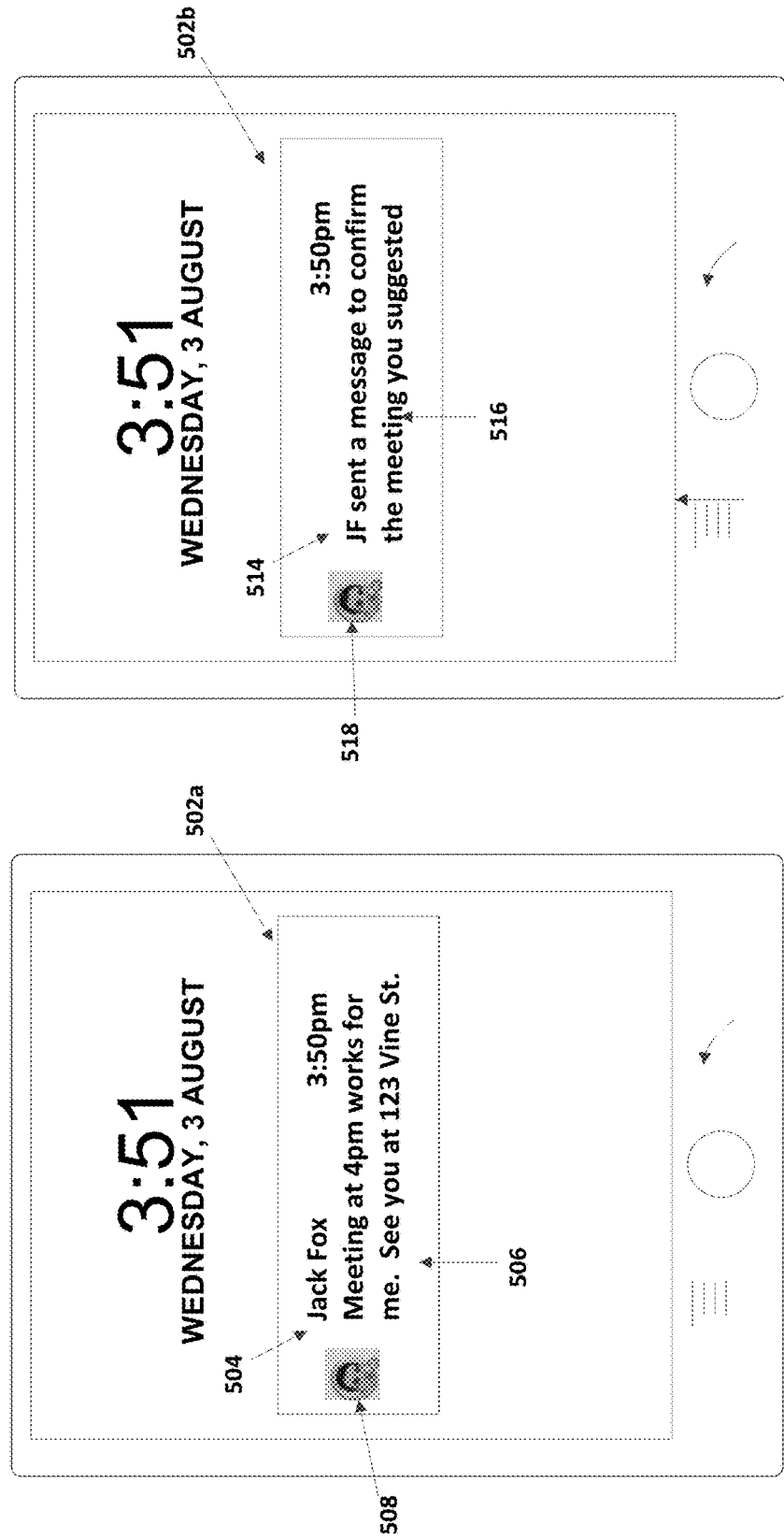

SELECTIVE OBFUSCATION OF NOTIFICATIONS

BACKGROUND

Mobile operating systems typically include mechanisms by which applications can send notifications to the user. These notifications alert the user of application events, and can include information from or descriptive of the application event. For instance, notifications are commonly used to inform the user of a new text message, email, social network post, or other such application events.

When a mobile device is locked, notifications may be shown on a mobile device's lock-screen, prior to the device being unlocked. If such lock-screen notifications reveal sensitive or private information, they can present a privacy and/or security risk; potentially allowing anyone who has physical (or perhaps just visual) access to the phone to learn this information, without providing any sort of authentication (e.g., a password, swipe pattern, or fingerprint scan).

Some existing lock-screen notification solutions provide users the option to obscure information in lock-screen notifications by hiding all event content, and displaying only a description of the type of application event or events that occurred. For example, if a user has not selected an option to obscure notifications for a text-message application, the notification for a new text message might indicate the sender of the text message and/or preview the text from the message itself. However, if a user has selected an option to obscure information in notifications, the lock-screen notification for a text-message application might simply say "You have 3 new messages" without any indication of content of those text messages, or who the sender(s) of the text messages are.

SUMMARY

Lock-screen notifications have the potential to be very useful, if they are able to quickly and non-intrusively inform the user of the contents of the corresponding application event. In some cases, the information provided by a notification may even alleviate the need for the user to open the application from which the notification originated to obtain the information from the application event described by the notification.

While techniques that obscure the content of lockscreen notifications entirely can help protect personal and/or sensitive information, such techniques can greatly reduce the utility of lock-screen notifications for the user. For example, when the notification for a text-message application simply reads "You have 1 new message," without any indication of content of the text message, the user is not informed who the message is from or what the message is about. Thus, the current approach to lock-screen notifications forces a user to choose between protecting potentially sensitive information, and having substantively informative lock-screen notifications. Accordingly, embodiments described herein may provide or facilitate lock-screen notifications that protect potentially sensitive information, while still providing useful information relating to the corresponding application event.

In one aspect, a method involves a computing device: (a) receiving an indication of an application event comprising event content, while a computing device is operating in a restricted-access mode; (b) in response to the indication of the application event, determining notification content comprising at least a portion of the event content; (c) applying filter criteria to the notification content to identify portions of the notification content for obfuscation; (d) generating filtered notification content by obfuscating any identified portions of the notification content, such that the filtered notification content comprises a non-obfuscated portion of the event content and an obfuscated portion of the event content; and (e) while the computing device is still operating in the restricted-access mode, causing a graphic display to display an unrestricted notification comprising the filtered notification content.

In another aspect, an example computing device includes a graphic display, a processor, and program instructions stored on a non-transitory computer-readable medium and executable by the processor to: (a) cause the computing device to operate in a restricted-access mode; (b) during operation in the restricted-access mode, receive an indication of an application event comprising event content; (c) in response to the indication of the application event, determine notification content comprising at least a portion of the event content; (d) apply filter criteria to the notification content to identify portions of the notification content for obfuscation; (e) generate filtered notification content by obfuscating at least one identified portion of the notification content, such that the filtered notification content comprises a non-obfuscated portion of the event content and an obfuscated portion of the event content; and (f) during operation in the restricted-access mode, cause the graphic display to display an unrestricted notification comprising the filtered notification content.

In yet another aspect, a method involves: (a) while a first computing device is operating in a restricted-access mode, receiving, by a second computing device, an indication of an application event comprising event content, wherein the application event corresponds to an application of the first computing device; (b) in response to the indication of the application event, determining, by the second computing device, notification content comprising at least a portion of the event content; (c) applying, by the second computing device, filter criteria to the notification content to identify portions of the notification content for obfuscation; (d) generating, by the second computing device, filtered notification content in which at least one identified portion of the notification content is obfuscated, such that the filtered notification content comprises a non-obfuscated portion of the event content and an obfuscated portion of the event content; and (e) while the first computing device is still operating in the restricted-access mode, causing a graphic display to display an unrestricted notification comprising the filtered notification content.

These as well as other aspects, advantages, and alternatives, will become apparent to those of ordinary skill in the art by reading the following detailed description, with reference where appropriate to the accompanying drawings.

BRIEF DESCRIPTION OF THE DRAWINGS

FIGS. 4A and 4B show alternate versions of a lock-screen notification, according to example embodiments.

FIGS. 5A to 5C show alternate versions of another lock-screen notification, according to example embodiments.

DETAILED DESCRIPTION

Figure 1:
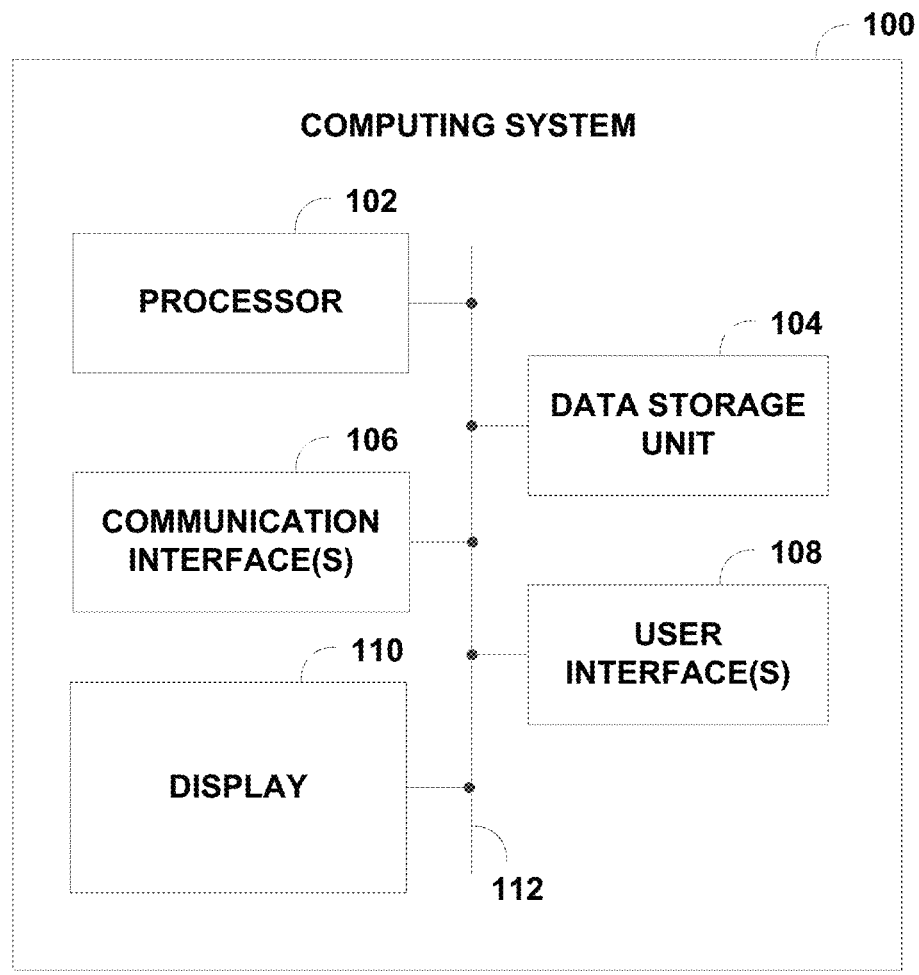
FIG. 1 is a simplified block-diagram of an example computing system.

Example methods and systems are described herein. It should be understood that the words "example," "exemplary," and "illustrative" are used herein to mean "serving as an example, instance, or illustration." Any implementation or feature described herein as being an "example," being "exemplary," or being "illustrative" is not necessarily to be construed as preferred or advantageous over other implementations or features. The example implementations described herein are not meant to be limiting. It will be readily understood that the aspects of the present disclosure, as generally described herein, and illustrated in the figures, can be arranged, substituted, combined, separated, and designed in a wide variety of different configurations, all of which are explicitly contemplated herein.

I. Overview

An example method may be initiated by a computing device, such as a mobile phone or tablet, while the device is operating in a restricted-access mode (e.g., in a locked mode). While operating in the restricted-access mode, the computing device may receive an indication of an application event comprising event content (e.g., a new text message). In response, the computing device may determine notification content that includes at least a portion of the event content (e.g., text from the new text message and perhaps the sender's name). Before displaying the notification content on the lock-screen, the computing device may apply filter criteria to the notification content to identify portions of the notification content for obfuscation. The computing device may then generate filtered notification content by obfuscating any identified portions of the notification content, such that the filtered notification content comprises a non-obfuscated portion of the application event content and an obfuscated portion of the application event content, and display a lock-screen notification comprising the filtered notification content.

In some embodiments, the application event may be associated with an intended recipient, such as the user of the computing device (or more specifically a user whose user-account is currently associated with the device). As such, the filtered notification content may be tailored to provide information that is useful to the particular user, but also protects sensitive information. To do so, the filtered notification content may combine the non-obfuscated portion of the event content and the obfuscated portion of the event content, such that when viewed by an intended recipient, the filtered notification content provides implicit information that the device expects the particular user to understand. In other words, the device may rewrite the notification content so that the filtered notification content can still be informative to the owner of the phone, without revealing sensitive or private information to others that may look at or access the device's lock-screen.

In practice, an example method may be implemented to analyze each incoming notification that is received by the mobile device (e.g., by a notification handler module that is part of the device's operating system). The title and notification text may be analyzed using on-device entity annotators, in order to annotate names other types of information that an intended recipient might not want an unauthorized viewer to see. A portion (but not all) of the text may then be obscured in the notification displayed on a lock screen. For example, in a notification for a text message, rather than displaying the sender's full name (e.g., "John Doe"), an abbreviated identifier (e.g., "JD") or partially obfuscated name (e.g., "J* D") may be displayed. The degree and/or technique for partial obfuscation may vary depending on user settings and/or other factors.

Additionally or alternatively, notification image content can be analyzed using image-processing that an intended recipient might not want an unauthorized viewer to see, such as people's faces (e.g., a picture of a message sender). More specifically, images could be filtered for inclusion in lock-screen notifications by blurring, masking, or pixellating the entire image, or selected parts of the image (e.g., part where sensitive objects such as faces are detected).

By obfuscating notification content such that the content is still expected to provide a certain information to an intended recipient, which is not readily apparent to an unauthorized viewer, embodiments described herein yield a number of technical effects including, but not limited to, reduced power consumption and/or reduced user interactions with their device due to more efficient use of lock-screen notifications to provide information, and/or improving security of data stored on a device due to improved lock-screen functionality.

II. Illustrative Computing Devices

Referring now to the figures, FIG. 1 is a simplified block-diagram of an example computing system 100 that can perform various acts and/or functions, such as those described in this disclosure. Computing system 100 may be any type of device that can receive and process data, and display information corresponding to or associated with the data. For example, the computing device 110 may be a mobile phone, a tablet computer, a laptop computer, a desktop computer, a wearable computing device (e.g., in the form of a wrist band or a head-mountable device), or an in-car computer, among other possibilities.

Computing system 100 includes a processor 102, data storage unit 104, communication interface 106, user interface 108, and/or a display 110. These components as well as other possible components can connect to each other (or to another device, system, or other entity) via connection mechanism 112, which represents a mechanism that facilitates communication between two or more devices, systems, or other entities. As such, connection mechanism 112 can be a simple mechanism, such as a cable or system bus, or a relatively complex mechanism, such as a packet-based communication network (e.g., the Internet). In some instances, a connection mechanism can include a non-tangible medium (e.g., where the connection is wireless).

Processor 102 may correspond to a general-purpose processor (e.g., a microprocessor) and/or a special-purpose processor (e.g., a digital signal processor (DSP)). In some instances, computing system 100 may include a combination of processors.

Data storage unit 104 may include one or more volatile, non-volatile, removable, and/or non-removable storage components, such as magnetic, optical, or flash storage, and/or can be integrated in whole or in part with processor 102. As such, data storage unit 104 may take the form of a non-transitory computer-readable storage medium, having stored thereon program instructions (e.g., compiled or non-compiled program logic and/or machine code) that, when executed by processor 102, cause computing system 100 to perform one or more acts and/or functions, such as those described in this disclosure. Computing system 100 can be configured to perform one or more acts and/or functions, such as those described in this disclosure. Such program instructions can define and/or be part of a discrete software application. In some instances, computing system 100 can execute program instructions in response to receiving an input, such as from communication interface 106 and/or user interface 108. Data storage unit 104 may also store other types of data, such as those types described in this disclosure.

Communication interface 106 can allow computing system 100 to connect to and/or communicate with another other entity according to one or more communication protocols. A communication interface 106 can be a wired interface, such as an Ethernet interface or a high-definition serial-digital-interface (HD-SDI). Communication interface 106 can additionally or alternatively include a wireless interface, such as a cellular or WI-FI interface. A connection provided by a communication interface 106 can be a direct connection or an indirect connection, the latter being a connection that passes through and/or traverses one or more entities, such as such as a router, switcher, or other network device. Likewise, a transmission to or from a communication interface 106 can be a direct transmission or an indirect transmission.

A user interface 108 can facilitate interaction between computing system 100 and a user of computing system 100, if applicable. As such, a user interface 108 can include input components such as a keyboard, a keypad, a mouse, a touch sensitive and/or presence sensitive pad or display, a microphone, and/or a camera, and/or output components such as a display device (which, for example, can be combined with a touch sensitive and/or presence sensitive panel), a speaker, and/or a haptic feedback system. More generally, user interface(s) 108 can include any hardware and/or software components that facilitate interaction between computing system 100 and the user of the computing device system.

As indicated above, connection mechanism 112 may connect components of computing system 100. Connection mechanism 112 is illustrated as a wired connection, but wireless connections may also be used in some implementations. For example, the communication link 112 may be a wired serial bus such as a universal serial bus or a parallel bus. A wired connection may be a proprietary connection as well. Likewise, the communication link 112 may also be a wireless connection using, e.g., Bluetooth® radio technology, communication protocols described in IEEE 802.11 (including any IEEE 802.11 revisions), Cellular technology (such as GSM, CDMA, UMTS, EV-DO, WiMAX, or LTE), or Zigbee® technology, among other possibilities.

In a further aspect, computing system 100 includes a display 110. Display 110 may be any type of graphic display. As such, the display 110 may vary in size, shape, and/or resolution. Further, display 110 may be color display or a monochrome display.

Data storage unit 104 can store program instructions that are executable by processor 102 to run applications on computing system 100. Such applications may run in the foreground, while a user is directly interacting with the application via a user interface 108, or in the background, when a user is not directly interacting with the application. Further, applications may run in the background while computing system 100 is operating in a locked mode, and/or while other applications are running on the computing system 100. Such background applications may still receive data from various sources and/or generate data.

Events that occur within the context of a particular application may be referred to as "application events." An application and/or a notification handler module may be configured to trigger notifications in response to certain application events that are detected while a corresponding application is running in the background (or more generally, at any time when the corresponding application is not running in the foreground).

Herein, an "application event" should be understood to be any event to which a computer application and/or another application or program-code module (e.g., a notification handler) responds by generating a notification. For example, receipt of an incoming message formatted for a particular application, or the availability of new content via a certain application, may be considered application events. Many other examples of application events are also possible. In example embodiments, an application or a separate notification handler may generate notification content in response to detecting an application event. When notification content is generated by an application, notification content may be sent to a notification handler running on the computing system 100, such that a corresponding notification can be displayed in various ways on display 110.

In a further aspect, memory 118 may include program instructions stored on a non-transitory computer-readable medium and executable by the at least one processor to carry out and/or initiate functions described herein. For instance, such program instructions may be executable to: (a) while a computing device operates in a restricted-access mode (e.g., a locked mode), receive an indication of an application event comprising event content, (b) in response to the indication of the application event, determine notification content including at least a portion of the event content; (c) apply filter criteria to the notification content to identify portions of the notification content for obfuscation (e.g., by using entity annotators to identify certain types of named entities and/or other types of text segments and/or image content in the unfiltered notification content); (d) generate filtered notification content by obfuscating any identified portions of the notification content, such that the filtered notification content comprises a non-obfuscated portion of the event content and an obfuscated portion of the event content; and (e) while the computing device is still operating in the restricted-access mode, cause a graphic display to display an unrestricted notification comprising the filtered notification content.

Figure 2:
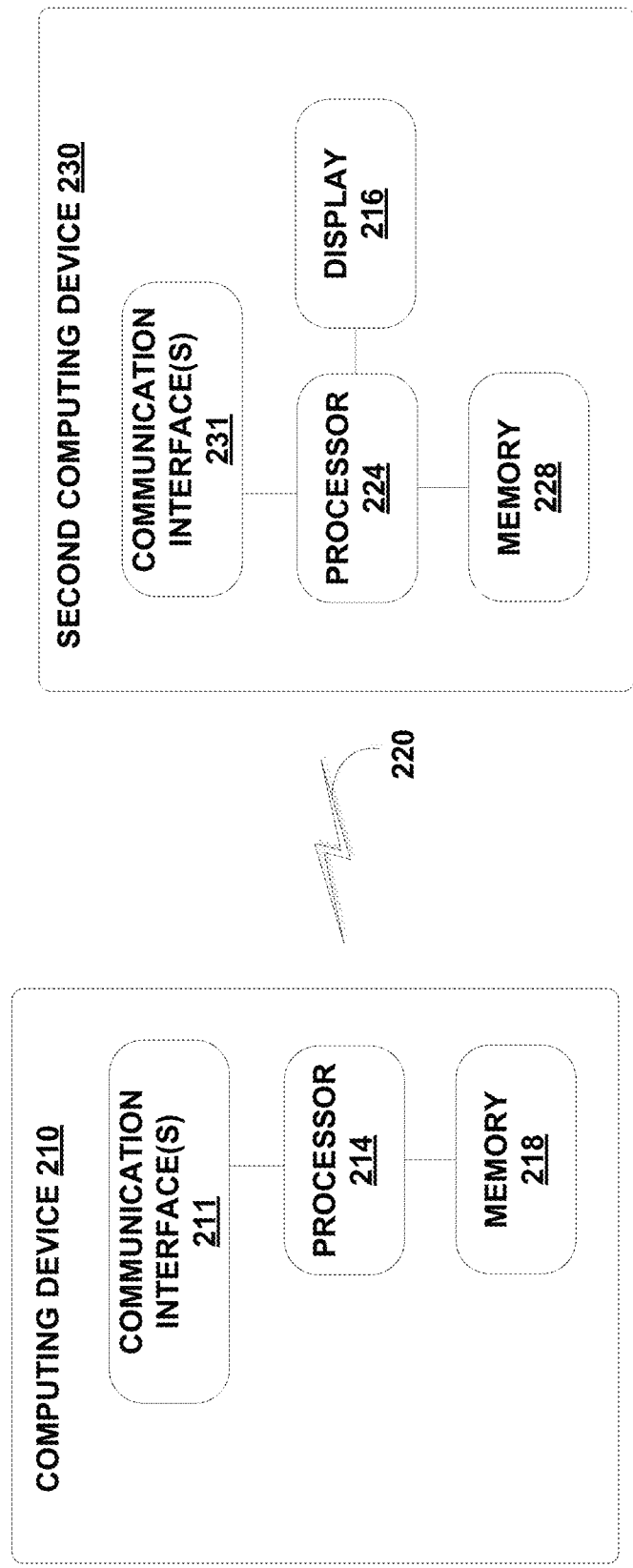
FIG. 2 is a block diagram showing basic components of a computing device and a second computing device that can coordinate to provide functionality for a user.

Example methods and systems are also applicable in arrangements two or more computing devices can coordinate with one another to provide notifications for application events. For example, notifications corresponding to application events on a first computing device, can be displayed via a second computing device. FIG. 2 is a block diagram showing basic components of a computing device 210 and a second computing device 230 that can be coordinate to provide such functionality for a user.

Computing device 210 may be configured in a similar manner to computing system 100, although differences are also possible. Further, computing device 210 and a second computing device 230 could both be end-user devices, such as a mobile phone and laptop computer, or mobile phone and in-car computer, among other possibilities. In other implementations, computing device 210 could be a server system (e.g., a cloud based application server), while second computing device 230 is an end-user device. Further, in some implementations, computing device 210 could function as a server that relays communications between a second computing device 230 and one or more third computing devices (not shown). In such implementations some or all of the second computing device 230 and the one or more third computing devices could be end-user devices that are associated or linked through one or more common user-accounts.

Notably, computing device 210 is not shown as including a display. While it is possible that computing device 210 could include a graphic display, FIG. 2 illustrates a configuration in which a graphic display system 216 of the second computing device 230 can display information related to applications running on the first computing device, including notifications relating to application events detected by applications running computing device 210. Examples of such arrangements include, but are not limited to: (a) an in-car computer that can display notifications and/or other information related to applications running on a user's mobile phone, (b) a mobile phone, tablet computer, and/or desktop computer that are synchronized to a common user-account, and can display notifications and/or other information related to applications running on a server system that is associated with the common user-account, and (c) a wearable computing device (e.g., a smart watch or head-mountable display device) that is tethered to a mobile phone, and can display notifications and/or other information related to applications running on the mobile phone. Other arrangements and implementations are also possible.

The second computing device 230 and computing device 210 include hardware and/or software to enable communication with one another via the communication link 220, such as processors, transmitters, receivers, antennas, etc. In the illustrated example, computing device 210 includes one or more communication interfaces 211, and second computing device 230 includes one or more communication interfaces 231. In some implementations, the second computing device 230 may be tethered to the computing device 210 via a wired or wireless connection (e.g., via Bluetooth). In some embodiments, a separate server system (not shown) may synchronize certain functionality between the second computing device 230 and computing device 210. For example, the server may push notifications to both devices and/or relay information relating to applications running on one device to the other. Alternatively, computing device.

Note that a wired or wireless connection between computing device 210 and wearable computing device 230 may be established directly (e.g., via Bluetooth), or indirectly (e.g., via the Internet or a private data network). More generally, communication link 220 may be a wired link, such as a universal serial bus or a parallel bus, or an Ethernet connection via an Ethernet port. A wired link may also be established using a proprietary wired communication protocol and/or using proprietary types of communication interfaces. The communication link 220 may also be a wireless connection using, e.g., Bluetooth® radio technology, WiFi communication protocols described in IEEE 802.11 (including any IEEE 802.11 revisions), Cellular technology (such as GSM, CDMA, UMTS, EV-DO, WiMAX, or LTE), or Zigbee® technology, among other possibilities.

As noted above, to communicate via communication link 220, computing device 210 and second computing device 230 may each include one or more communication interface(s) 211 and 231 respectively. The type or types of communication interface(s) included may vary according to the type of communication link 220 that is utilized for communications between the computing device 210 and the second computing device 230. As such, communication interface(s) 211 and 231 may include hardware and/or software that facilitates wired communication using various different wired communication protocols, and/or hardware and/or software that facilitates wireless communications using various different wired communication protocols.

Computing device 210 and second computing device 230 include respective processing systems 214 and 224. Processing system 214 and/or 224 may be implemented with a general-purpose processor (e.g., a microprocessor) and/or a special-purpose processor (e.g., a digital signal processor (DSP)). In some instances, processor 214 and/or 224 may include a combination of processors, of the same type or of different types.

Computing device 210 and a wearable computing device 230 further include respective on-board data storage, such as memory 218 and memory 228. Processors 214 and 224 are communicatively coupled to memory 218 and memory 228, respectively. Memory 218 and/or memory 228 (any other data storage or memory described herein) may be computer-readable storage media, which can include volatile and/or non-volatile storage components, such as optical, magnetic, organic or other memory or disc storage. Such data storage can be separate from, or integrated in whole or in part with one or more processor(s) (e.g., in a chipset). In some implementations, memory 218 and/or memory 228 can be implemented using a single physical device (e.g., one optical, magnetic, organic or other memory or disc storage unit), while in other implementations, memory 218 and/or memory 228 can be implemented using two or more physical devices.

Memory 218 can store machine-readable program instructions that can be accessed and executed by the processor 214. Similarly, memory 228 can store machine-readable program instructions that can be accessed and executed by the processor 224. As such, memory 218, memory 228, or a combination of both include program instructions executable to perform functions described herein. For example, memory 218 and/or memory 228 can include program instructions executable to: (a) while the second computing device 230 is operating in a restricted-access mode, receive an indication of an application event comprising event content, (b) in response to the indication of the application event, determine notification content comprising at least a portion of the event content, (c) applying filter criteria to the notification content to identify portions of the notification content for obfuscation, (d) generate filtered notification content in which at least one identified portion of the notification content is obfuscated, such that the filtered notification content comprises a non-obfuscated portion of the event content and an obfuscated portion of the event content, and (e) while the second computing device is still operating in the restricted-access mode, cause graphic display 216 to display an unrestricted notification comprising the filtered notification content.

III. Illustrative Methods

Figure 3:
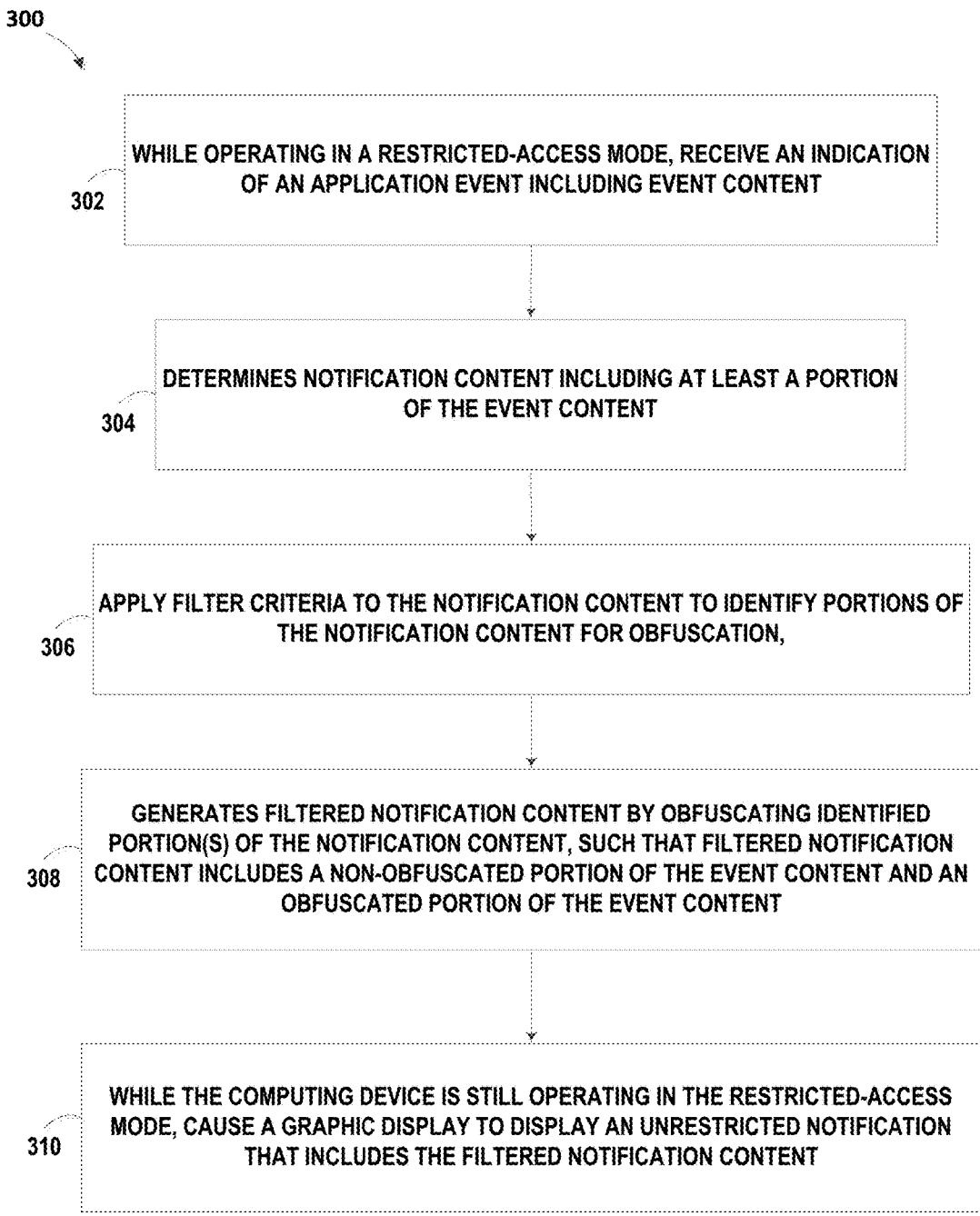
FIG. 3 is a flow chart illustrating a method, according to example embodiments.

FIG. 3 is a flow chart illustrating a method 300, according to example embodiments. Method 300 may be implemented by a computing device, such as the computing system 100 shown in FIG. 1, the computing device 210 or the second computing device 230 shown in FIG. 2, or a combination of such devices. Other types of computing devices may also implement method 300, without departing from the scope of the invention.

Method 300 may be implemented while a computing device is operating in a restricted-access mode, such as a locked mode. More specifically, while operating in the restricted-access mode, the computing device receives an indication of an application event, as shown by block 302.

The application event includes application content. In response to the application event, the computing device determines notification content including at least a portion of the event content, as shown by block 304. The computing device then applies filter criteria to the notification content to identify portions of the notification content for obfuscation, as shown by block 306. The computing device then generates filtered notification content by obfuscating any identified portions of the notification content, as shown by block 308. As such, the filtered notification content comprises a non-obfuscated portion of the event content and an obfuscated portion of the event content. Then, while the computing device is still operating in the restricted-access mode, the computing device causes a graphic display to display an unrestricted notification that includes the filtered notification content, as shown by block 310.

a. Operating in the Restricted Access Mode

At block 302, operation in the restricted access mode may involve the computing device preventing or limiting access to certain functionality, without first providing some sort of authenticating input data. For example, the computing device may be locked, such that a password, passcode, fingerprint, or other authentication data is required in order to access an application.

Further, at the time block 302 is carried out, the restricted access mode may prevent or limit access to an application that provides the indication of the application event. For instance, block 302 may be carried out when a text message is received by a text-messaging application that is not accessible to the user while a computing device is locked. Other examples are also possible.

b. Receiving an Indication of an Application Event

The function of receiving an indication of an application event, at block 302, can involve receipt of a data message that identifies, describes, or otherwise relates to an application event.

As an example, consider the scenario where a device runs an operating system that provides an application programming interface (API). The API may provide a mechanism by which applications can provide notifications to the user. For instance, the API may provide a mechanism for applications to send notifications to a notification handler, which generates, filters, and routes notifications according to certain parameters, which can vary according to the operating state of the device and/or other factors. As such, block 302 may involve an operating system's notification handler receiving a notification (or an indication thereof) from an application running on the computing device, and/or the application itself detecting the application event.

It should be understood, however, that the above example is not intended to be limiting. Other indications of an application event are also possible.

c. Determining Notification Content

At block 304, the computing device determines notification content that includes event content. Herein, the "event content" should be understood to include some or all of the actual content from an application event. Thus, event content is distinguishable from a general description of the type of event. For example, when an e-mail or text message is received, the event content can include some or all of the actual text from the body and/or subject line of the message. A general description of the event may simply indicate the fact that an e-mail or text message was received, without providing further detail.

In some embodiments, the notification content determined at block 304 is unfiltered, or is perhaps filtered or truncated due to size and/or space limitations for notifications. However, the notification content determined at block 304 is not yet filtered based on the information provided by notification content. For example, when an e-mail or text message is received, the notification content determined at block 304 may include some or all of the actual text from the body and/or subject line of the message (e.g., some or all of the event content). The text from the e-mail or text message may be truncated (e.g., due to space limitations for notifications), but is not yet filtered based on the substance of the words and/or images in the message. Other examples are also possible.

Note that in some embodiments, the user may adjust a system option or setting, so as to turn off filtering according to a method such as method 300. In this case, the computing device may simply display a notification that includes the notification content generated at block 304 (e.g., unfiltered notification content).

d. Identifying Potentially-Sensitive Information for Obfuscation

At block 306, various filter criteria or combinations of filter criteria may be applied to the notification content, in order to identify portions of the notification content for obfuscation.

In some embodiments, the filter criteria may take the form of entity annotators that are applied to the notification content determined at block 304. Each entity annotator may be implemented in software, hardware, and/or firmware, and may include program instructions executable by a processor to analyze text and identify a certain type of information or content within the notification content. For instance, separate entity annotators may be utilized to identify and annotate phone numbers, addresses, email addresses, public named entities (e.g., publicly available names of people or places), and private named entities (e.g., names of contacts stored in a user's contact list).

In a further aspect, notification content may include text, image data, and/or other types of media content. Accordingly, obfuscation techniques may be applied to different types of notification content. For instance, textual entity annotators may be applied to the text included in the notification content, while visual entity annotators may be applied to image or video data included in the notification content.

In some embodiments, on-device entity annotators may be applied to the title and text included in an unaltered notification provided by an application. Each textual entity annotator may be designed to detect a different type of potentially-sensitive entity in text. For example, a first entity annotator may be applied to detect phone numbers, a second entity annotator may be applied to detect addresses, a third entity annotator may be applied to detect email addresses, a fourth entity annotator may be applied to detect public named entities (e.g., publicly available names of people or places), a fifth entity annotator may be applied to detect private named entities (e.g., names of contacts stored in a user's contact list), and so on. Of course, it should be understood that the foregoing example is just one of many possible combinations of entity annotators that could be utilized.

Some entity annotators may be used to search notification text for named entities (NEs), which are references to things that have defined names associated with them; e.g., a person, city, product, business, street, etc. Named entities can include public named entities and/or private named entities. Public named entities may include subjects that are named in the public domain (e.g., the name of public figure, or the official name of a building), while private named entities are named with respect to some local source (e.g., a friend's name that is saved in user's mobile phone contact list). Note that in some cases, it is possible for the same entity to be classified as both a public and private entity.

Various techniques for named-entity recognition (NER) (which can also be referred to as entity identification, entity chunking, or entity extraction, among other possibilities) can be used to identify and annotate portions of text within a corpus of text, with pre-defined categories such as the names of persons, business name, locations, expressions of times, quantities, monetary values, percentages, etc. In practice, a named entity recognition module may take unannotated text (such as notification content determined at block 304), and output an annotated version of the text.

As such, at block 306, the application of filter criteria to identify portions of notification content for obfuscation may include a named entity recognition process that is designed to identify certain textual portions of notification content for obfuscation. In example embodiments, certain types of named entities may be categorized as including potentially sensitive information; e.g., information that an intended recipient might not want an unintended viewer to see.

In some embodiments, block 306 may involve the use of named entity recognition in conjunction with other techniques, in order to detect potentially sensitive information in notification content. For example, one or more visual entity annotators may be applied to image data to identify a specific type or specific types of visually-provided information. For instance, a first visual entity annotator may be applied to detect faces, and annotate the location or area in image data corresponding to a detected face, a second visual entity annotator may be applied to detect visual information that could reveal a person's location (e.g., a high-profile landmark in the background of an image), and so on.

It should be understood that block 306 can also involve use of other image-based and/or text-based processes for identifying potentially-sensitive information in notification content, in addition or in the alternative to the processes described herein. In any such case, the resulting annotations of text and/or media, may then be used to remove or obscure text and/or an image, or portions thereof, which include potentially sensitive information; e.g., by using annotations and/or other information determined at block 306 to generate filtered textual notification content at block 308.

In a further aspect, various levels of sensitivity and corresponding degrees of obfuscation may be defined and associated with various types of named entities. As such, block 308 may involve applying varying degrees of obfuscation to different types of entities. For instance, more sensitive public named entities may be annotated as such, and may be obfuscated to a greater degree due to their more-sensitive nature. For example, in a calendar reminder, the name of a user's doctor office may be removed entirely or obfuscated to a greater degree in filtered notification content (e.g., "Appointment at *******"), as compared to the name of nail salon in a similar calendar reminder ("e.g., "Appointment at S** Nail Salon"). Many other examples of varying degrees of obfuscation are possible.

In embodiments described herein, entity annotators can be tuned to have a high recall, sometimes at the expense of precision so as to make sure that all private information is correctly identified. Of course, it is possible that entity annotators could alternatively be tuned to have a lower recall, without departing from the scope of the invention.

e. Generating and Displaying Filtered Notification Content

To obfuscate portions of the media content, a notification handler or another such module, may remove or alter certain portions of text and/or image content. Further, in some cases, obfuscation may involve substitution of alternate content for a portion of the original notification content, and/or removal of a portion of the original notification content.

Yet further, different obfuscation techniques may be utilized for different annotations. For instance, different obfuscation techniques may be utilized for phone numbers, addresses, and email addresses, among other possibilities. Other examples are also possible.

In example embodiments, notification content may be obfuscated in manner such that the filtered notification content is expected to be recognizable to the intended recipient, but is unlikely to be useful to an unauthorized viewer. To do so, a notification handler may utilize data from a user-account associated with the user-device, context information associated with the computing device and/or with a user-account associated with the user-device, and/or other information, to adjust annotations for a specific intended recipient.

IV. Examples of Filtered Notification Content

Example techniques for generating filtered notification content will now be illustrated by way of example, with reference to FIGS. 4A and 4B, FIGS. 5A to 5C, and FIGS. 6A and 6B. The filtered notification content in these figures may be generated utilizing example methods, such as method 300. The notifications shown in FIGS. 4A to 6B may be displayed on a lock screen (e.g., while a computing device is operating in a locked mode). However, the notifications illustrated in FIGS. 4A to 6B may also be utilized in other scenarios where access to the computing device or application that generated the notification is restricted, and a notification is being displayed in an unrestricted or less restricted manner.

FIGS. 4A and 4B show alternate versions of a lock-screen notification corresponding to the same application event. FIG. 4A shows a notification 402a, which could be displayed when a user has disabled notification obfuscation according to an example method (e.g., via a system setting of the computing device). Thus, notification 402a provides an unfiltered version of notification content, which includes the full name 404 of the contact who sent the message ("Matt Snow"), unaltered text 406 from the message itself (including the sender's phone number), and an image 408 including the sender's face. Note that the image 408 may be an avatar or profile image from the sender's account with the messaging application, may be associated with the sender's contact information stored on the computing device, or may otherwise be associated with the sender.

FIG. 4B shows a notification 402b that provides a filtered version of the notification content that notification 402a provides in unfiltered form. As such, notification 402b may be displayed instead of notification 402a, when a user of the computing device has enabled notification obfuscation according to an example method. It is noted, however, that the ability to enable and/or disable filtering according to an example method is optional, since a device could be pre-configured to always apply obfuscation according to an example embodiment.

Notification 402b may include filtered notification content that is generated in accordance with an example method; e.g., at block 308 of method 300. In the illustrated example, three types of entities have been identified and obfuscated.

First, the phone number "+41 123 555555" was annotated and obfuscated. As such, the text 416 of notification 402b includes only a portion of the phone number included in the original event content, with the remaining portion being obfuscated. Thus, notification 402b displays the sender's phone number as "+41 123 5****5".

Second, at block 306 of method 300, a notification handler may identify and annotate "Matt Snow" as a private named entity, which matches a name in a contact list associated with the computing device (e.g., in a contact list associated with an account that is currently linked to the computing device). Accordingly, at block 308, the sender's name may be altered to help protect the identity of the sender. Thus, in the example illustrated by notification 402b, the sender's last name may be replaced with an initial, such that sender name 414 in notification 402b reads only "Matt S".

Third, a visual entity annotator may analyze an image included in the unaltered notification content, and detect the sender's face in the image. As such, the image may be processed to obscure the user's face (e.g., using blurring or pixilation), or remove the user's face altogether. In the example illustrated by notification 402b, the face of the sender has been blurred in image 418.

Figure 5C:

FIGS. 5A to 5C show alternate versions of a lock-screen notification for the same application event. (Note, however, that the application event corresponding to FIGS. 5A to 5C is not the same as the application event corresponding to FIGS. 4A and 4B.) FIG. 5A shows a notification 502a, which could be displayed when a user has disabled notification obfuscation according to an example method (e.g., via a system setting of the computing device). Thus, notification 502a provides an unfiltered version of notification content from an application event, which in this example is receipt of a message by a messaging application (e.g., an email or text messaging application). As such notification 502a includes the full name 504 of the contact who sent the message ("Jack Fox"), unaltered text 506 from the message itself (including an address and time for meeting), and an image 508 including the sender's face.

The notifications 502b and 502c shown in FIGS. 5B and 5C include two different filtered versions the notification content that was displayed in unfiltered form in notification 502a. As noted above, such filtered notification content can be generated by implementing an example method such as method 300. Further, as the differences between the filtered notification content in 502b and the filtered notification content in 502c may result from consideration of various factors related to the target recipient and/or the particular computing device on which the filtered notification content is being displayed. As explained in greater detail below, such factors may be used to vary the obfuscation technique that is applied to a given entity, such that the representation of the given entity in the filtered notification content differs.

In notification 502b, four entities have been identified and obfuscated. First, the sender's name ("Jack Fox") may be annotated as a private named entity, and replaced with initials, such that sender name 514 in notification 502b reads only "JF". Additionally, notification 502b includes an image 518 in which a face is obscured. The face may be obscured in a similar manner as described in reference to the face in image 418. Further, the address "123 Vine St." and the time "4pm" are annotated as an address entity and a time entity, respectively, and obfuscated in the filtered notification content shown in notification 502b. In particular, text from the message itself is replaced with text that describes the information included in the message, without providing the exact time and address of the meeting (e.g., "JF sent a message to confirm the meeting details you suggested").

In notification 502c, the same four entities have been identified and obfuscated. However, using techniques such as those described in greater detail below, the filtered notification content in notification 502c differs from the filtered notification content in notification 502b, even though both are based upon the same unfiltered notification content. More specifically, while notification 502c also includes the image 518 in which the sender's face is obscured, notification 502c removes the sender's name entirely. Furthermore, obfuscation of the address and time entities is accomplished by obfuscating the annotated text only (rather than replacing a larger portion of the text including these entities, as done in notification 502b).

Figure 6B:
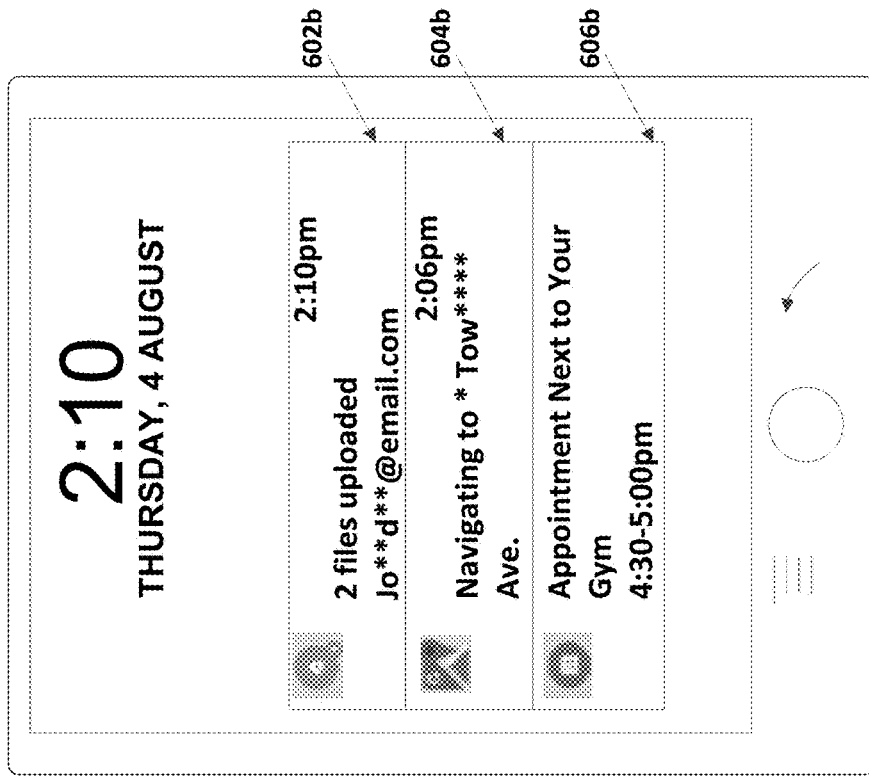
FIGS. 6A and 6B show alternate versions of another lock-screen notification, according to example embodiments.
Figure 6A:
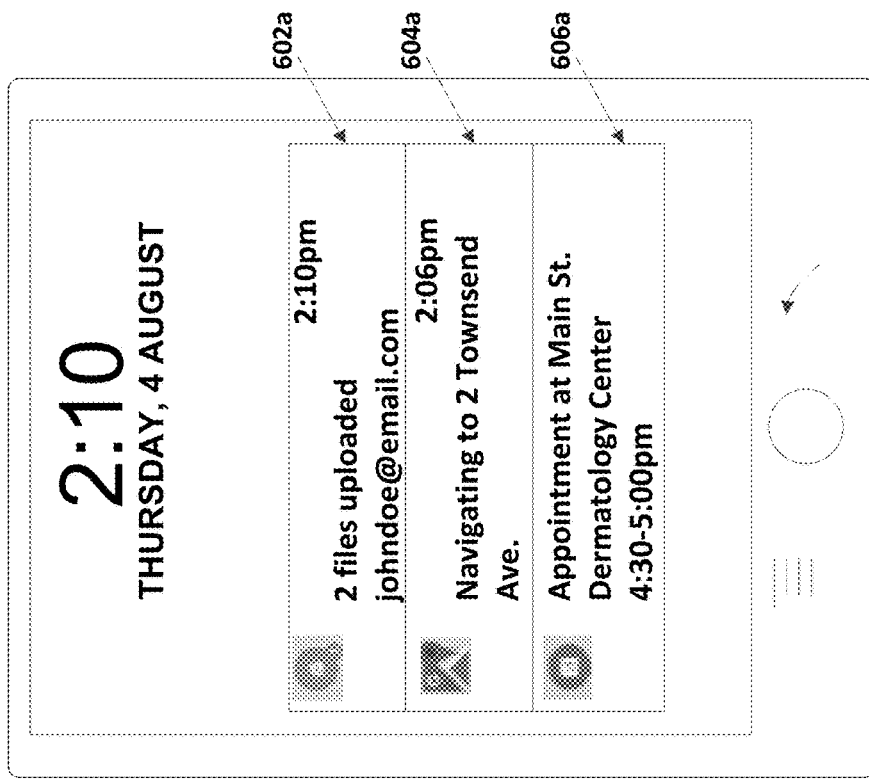

FIGS. 6A and 6B show alternate versions of lock-screen notifications for a group of application events. FIG. 6A shows notifications 602a, 604a, and 606a that include unfiltered notification content corresponding to application events from three different applications. The application events corresponding to notifications 602a, 604a, and 606a include a file upload to a cloud storage application, the existence of an ongoing navigation process via a map application, and a reminder for an appointment from a calendar application, respectively. Further, the notifications 602a, 604a, and 606a shown in FIG. 6A could be displayed when a user has disabled a notification obfuscation feature, in accordance with some embodiments (e.g., via a system setting of the computing device).

In notification 602b, an email entity has been identified and obfuscated. Specifically, the email address "johndoe@email.com," which is shown in full in notification 602a, is obfuscated to read "jod@email.com" in notification 602b. Note that such an email entity may be a private or public named entity, depending on whether or not the email address is associated with mobile device (e.g., included in a contact list that is stored on the device or linked to a user account associated with the device).

In notification 604b, an address entity has been identified and obfuscated. Specifically, the address "2 Townsend Ave.", which is shown in full in notification 604a, is obfuscated to read "* Tow**** Ave." in notification 604b. Note that such an address entity may be a private or public named entity, depending on whether or not the address is known to the mobile device (e.g., whether the address is part of a contact entry that is stored locally on the device or linked to a user account associated with the device).

a. Targeted Obfuscation Directed to Intended Recipient

As noted above, an example method may obfuscate portions of text and/or image data in a notification such that an intended recipient is expected to be able to derive information from the notification, while an unauthorized viewer is not. Note that in some cases, such targeted obfuscation may be performed with a generic intended recipient, rather than being tailored to the specific intended recipient of a particular notification.

For instance, referring back to FIG. 4B, notification 402b provides several examples of targeted obfuscation of notification content, expected to provide implicit information to an intended or authorized viewer, but not to an unintended or unauthorized viewer. For instance, when an intended recipient who has seen and/or dialed the phone number +41 123 555555 in the past views the obfuscated phone number ("+41 123 5****5") in notification 402b, the obfuscated phone number may prompt the intended recipient to recall the full phone number from their memory. However, due to the obfuscation, the obfuscated phone number will be of little use to someone who has never used this phone number before.

As another example, when annotators identify a private named entity, such as a person or place stored in a user's contact list, the name for the entity may be filtered or obfuscated such that the owner of the device is expected to understand the entity's identity, but an unauthorized user is not. For instance, again referring to FIG. 4B, the entity for a person's name ("Matt Snow") may have been identified as a private named entity of a person; e.g., based on an entry for Matt Snow in a contact list stored locally on the computing device (which perhaps includes the phone number that the sender included in the message). The fact that "Matt Snow" is annotated as a private named entity for a person may be interpreted to mean that the intended recipient is familiar with Matt Snow. As such, it is likely that the intended recipient, being the owner or user of the computing device can infer from the obfuscation of the name in notification 402b (i.e., "Matt S"), that the message is from Matt Snow.

As noted above, example methods may involve targeted filtering of image content. For example, an image including a person's face can be pixelated, blurred, or otherwise altered, such that stranger is unlikely to identify the person from the altered image, but an intended recipient who is familiar with the person of face may still be able to recognize the person in the altered image (particularly when combined with other information, such as an obfuscated version of the person's name).

To illustrate, and again referring back to FIG. 4B, notification 402b includes an image 418, which is generated from an image with a person's face (e.g., a profile picture, avatar, or contact image from a contact list). In notification 402b, the region of the image with a person's face has been blurred such that some general characteristics of the person's face and/or the rest of the image (e.g., hair color, background color, shirt color, etc.) are still discernable, but more detailed characteristics are obscured. A recipient who is familiar with the user's appearance and/or who has seen an unaltered version of an avatar or profile picture in the past, may be able to identify the sender from the general characteristics that are still discernable. However, a stranger who has never seen the person and/or the original image before, is unlikely to be able to identify the user from the blurred version of their face included in notification 402b.

b. Targeted Obfuscation Based on Account Information

Additionally or alternatively, in some embodiments, the obfuscation of notification content may be based at least in part on information relevant to and/or associated with the specific intended recipient of particular notification. For example, notification content may be filtered based on account information from a user-account or accounts associated with or linked to the computing device that generates and/or displays a notification, and/or a user-account or accounts associated with or linked to the particular application corresponding to a notification.

For instance, the degree of obfuscation of a given named entity may vary based on a set of private named entities associated with a user account. More specifically, at block 308 of method 300, a computing device may compare a named entity detected in notification content (e.g., a sender's name for a text message) to a set of private named entities (e.g., all names stored in one or more contact lists associated with user account(s) of the intended recipient). The resulting obfuscation may apply a policy of trying to obscure or remove the greatest number of characters possible from the identified name, such that the obfuscated name is still unique and unambiguous to the intended recipient, based on detecting collisions in the recipient's address book. Such a policy may be applied in conjunction with other policies, such as including enough characters so that the name is still expected to be inferred by an intended recipient, among other possibilities.

In a further aspect of some embodiments, information provided by a user (with their consent), and stored in their account, may be used to determine how to obfuscate certain entities in notification content.

For instance, a user may be provided with adjustable settings, via which the user can vary the level of obfuscation in lock-screen notifications. In some embodiments, the degree (e.g., the percentage, amount, or technique of obfuscation) may be selected and/or adjusted across all entities, and/or individually for particular types of entities. For example, a user may opt to: (a) have individuals' names filtered out entirely (e.g., "Hi ****, do you want to meet for dinner tonight?"), (b) have a certain number of characters/digits of names obscured (e.g., 30% of the letters in a name), (c) have first and last names replaced with initials (e.g., "JD"), or (d) have last names only replaced with initials (e.g., "John D."), among other possibilities. As another example, a user could opt to have phone numbers filtered out entirely, or to have a certain number of digits filtered out (and perhaps could select which digits in the phone number should be removed). Other examples are also possible.

In a further aspect of some embodiments, interplay between multiple notifications including the same entity may be considered when generating notification content. For instance, when a phone number appears in several lock-screen notifications, the obfuscation of the phone number can be made consistent across all notifications on the same lock screen that include the phone-number entity. As a specific example, if a mobile device generates three notifications including the same phone number, the same digits of the phone number can be obfuscated in each notification. Doing so helps to prevent an unauthorized viewer from extracting the full phone number by combining different filtered versions of the phone number from several notifications.

c. Obfuscation Based on Context

In some embodiments, a mobile device may be configured to make context-based or location-based adjustments to the level of obfuscation in lock-screen notifications. In particular, a mobile device may (i) determine a location and/or other context information associated with subsequent display of the filtered notification content, (ii) select one of a plurality of obfuscation levels based on the determined location and/or context, and then (iii) select the filter criteria to be applied to the notification content based on the selected obfuscation level. In one specific example, when a mobile device detects that a user is located in their home, the device may reduce the amount of obfuscation applied to lock-screen notifications (or perhaps turn off filtering of lock-screen notifications altogether). And, when the mobile device detects that a user is located in a public place, the amount of obfuscation may be automatically increased.

Additionally or alternatively, a device could make context-based adjustments to the type of obfuscation and the particular types of entities that are obfuscated. For instance, when a device determines that the user is at work, the particular entities that are obfuscated, and the replacement text/image data utilized for obfuscation may be adjusted so that lock-screen notifications are more appropriate for a work environment (as compared to obfuscations made when the user is located in another public place). Note that such adjustments, which change the type of entities that are obfuscated based on context, may or may not increase or decrease the amount of obfuscation, on average, which is applied to notification content. In a further aspect of some embodiments, user settings may allow the user to adjust the manner in which such context-based adjustments to lock-screen-notification filtering are applied by the device.

In another aspect, filtering processes may utilize context information derived from associated user account(s), the environment of a computing device, and/or a user's past and/or current interactions with applications running on the computing device. For instance, a particularly sensitive named location can be obfuscated by replacing such a named location with text that indicates the location implicitly, by way of another reference point that is expected to be known by the intended recipient, but not readily identifiable to an unintended viewer. As a specific example, if a user's doctor's office and gym are near to one another, notification content including the text "appointment at Dr. Smith's office" could be replaced with "appointment at the office near to your gym" in a lock-screen notification.

As another example, consider again notification 502b in FIG. 5B, which uses context information derived from previous messages in a conversation to filter notification content in the notification 502b for the most recent message in the conversation. The unfiltered notification text 506 indicates a time and address for a meeting with Jack Fox. However, based on a messaging history, the computing device may determine that the message including text 506 is responsive to a previous message from the intended recipient; e.g., a previous message suggesting the meeting time and location as a possibility. (It is noted that such an inference might also be determined based on the meaning of text 506 itself, which seems to refer to a prefer message, with or without analyzing past messages.)

Accordingly, it may be assumed that an intended recipient already knows the meeting time and location that is being confirmed in notification text 506. Thus, in generating filtered notification content 516, the computing device addresses both the text annotated as an address entity (e.g., "123 Vine St.") and the text annotated as a time entity ("4pm") by replacing both entities with alternative text that relies upon the context-based assumption that the intended recipient knows the meeting time and location, and implicitly provides such information to the intended recipient by reference to "the meeting you suggested."

Note that FIG. 5C provides an example of how notification text 506 might be filtered if contextual information is not utilized, or differs in certain ways from the contextual information described in the preceding example. More specifically, in notification 502c, the address entity (e.g., "123 Vine St.") and the text annotated as a time entity ("4pm"), are filtered separately. Thus, filtered notification content 526 reads: "Meeting you at pm works for me. See you at * V*** St."

FIG. 6B provides another example of context-based variation of a filtering process. More specifically, in notification 606b, the named entity "Main St. Dermatology Center", which is shown in full in notification 606a, is obfuscated by replacing the named entity with the alternate text "next to your gym." In this example, the person who made the appointment at Main St. Dermatology Center, and who also has a membership at a gym located next door or adjacent to Main St. Dermatology Center, has the ability to remember that the appointment is at Main St. Dermatology Center when they view the notification 606 reminding them of an appointment next to their gym. However, it is unlikely that an unauthorized viewer of notification 606b, who does not know the location of the intended recipient's gym, would be able deduce that the appointment is at Main St. Dermatology Center.

It should be understood that the example uses of context information described above are not intended to be limiting. Many other types of context information and/or techniques for utilizing context information when generating filtered notification content are possible.

V. Machine Learning to Help Balance Protection of Sensitive Information and Utility of Notifications In some embodiments, machine learning processes may be applied to data related to lock-screen notifications and user interactions therewith, in an effort to increase the utility of lock-screen notifications to a particular user (or perhaps across all users). For instance, a device may collect information related to a user's interaction and/or understanding of a filtered lock-screen notification and adjust future lock-screen notifications in an effort to improve user understanding of filtered content (while continuing to balance utility of lock-screen notifications with the desire to protect sensitive information).

To do so, the device may determine when a lock-screen notification includes implicit information related to the application event, which it is expected will be understood by the user of the device. After displaying such a lock-screen notification, the device may receive input data associated with the display of the filtered notification content, and may analyze this input data to determine whether or not the implicit information was actually understood by the intended recipient. A machine-learning process may then adjust the level of obfuscation level based on whether or not the implicit information was actually understood by the intended recipient.

As a specific example, consider a scenario where a lock-screen notification includes implicit location information for an appointment (e.g., "appointment next to your gym"). If the user clears this lock-screen notification without opening the corresponding calendar or reminder application, and the device's location reports indicate immediate travel to the appointment's location, this may be interpreted to mean the user understood the implicit location information. Accordingly, a machine learning process may interpret this as a positive outcome, which reinforces the inference upon which the particular obfuscation was based. On the other hand, if the user opens an e-mail application and searches for appointments for some time before opening a map application to map the appointment's exact location, this may be an indication that the user has not fully comprehended the implicit location information. As such, a machine-learning process may adjust obfuscation in the future lock-screen notifications to apply a different level of obfuscation and/or to apply different types of obfuscation techniques to a given type of entity.

Not that the application of machine learning is not limited to the specific aspects described in this section. Machine learning could be used to help improve any and all aspects of the methods disclosed herein. For example, machine learning could be used to help better identify potentially sensitive content for obfuscation, and/or to help improve the manner in which particular types of notification content are obfuscated (e.g., to determine the degree and/or obfuscation technique that should be utilized), among other possibilities.

Further, machine learning may be utilized to improve functionality for an individual user, across groups of users, and/or across all users.

VI. Other Uses of Example Methods and Systems to Partially Obfuscate Notifications The methods and systems described herein may be implemented in any scenario where notification content corresponding to an application event from a restricted application, could be obfuscated or filtered for unrestricted or less-restricted display. For instance, example methods may be utilized to display filtered notifications a vehicle display, which relate to application events on a mobile device tethered to the vehicle's computing system. As another example, methods described herein could be implemented to generate filtered patient information to display to doctors or others who do not have access to the entirety of a particular patient's information. Many other examples are also possible.

VII. Conclusion

It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

Further, it should be understood that some or all aspects of example methods may be controlled via controls. In this regard, example methods or portions thereof may utilize and/or be initiated based on user input provided via user interfaces such as those described herein.

Additionally, a user may be provided with controls allowing the user to make an election as to both if and when systems, programs or features described herein may enable collection of user information (e.g., information about a user's social network, social actions or activities, profession, a user's preferences, or a user's current location), and if the user is sent content or communications from a server. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

Since many modifications, variations, and changes in detail can be made to the described example, it is intended that all matters in the preceding description and shown in the accompanying figures be interpreted as illustrative and not in a limiting sense.

We claim:

1. A computer-implemented method comprising:
   while a computing device is operating in a restricted-access mode, receiving, by the computing device, an indication of an application event comprising event content, wherein the application event is associated with an intended recipient having a user-account;
   in response to the indication of the application event, determining, by the computing device, notification content comprising at least a portion of the event content;
   based at least in part on data from the user-account of the intended recipient, selecting filter criteria that is applicable to notification content to obfuscate a portion of the notification content, such that when resulting filtered notification content is viewed by the intended recipient, the resulting filtered notification content implicitly indicates the obfuscated portion to the intended recipient;
   applying the selected filter criteria to the notification content to identify portions of the notification content for obfuscation;
   generating filtered notification content by obfuscating any identified portions of the notification content, such that the filtered notification content comprises a non-obfuscated portion of the notification content and an obfuscated portion of the notification content, and implicitly indicates the obfuscated portion when viewed by the intended recipient; and
   while the computing device is still operating in the restricted-access mode, causing a graphic display to display an unrestricted notification comprising the filtered notification content.

2. The method of claim 1, wherein the restricted-access mode comprises a locked mode.

3. The method of claim 1, wherein the user-account is associated with the computing device, and wherein at least one of the selected filter criteria identifies image data that potentially reveals privacy-sensitive information associated with the user-account.

4. The method of claim 1, wherein the filtered notification content combines the non-obfuscated portion of the notification content and the obfuscated portion of the notification content, such that when viewed by the intended recipient, the filtered notification content provides implicit information related to the application event.

5. The method of claim 1, wherein the application of the selected filter criteria to the notification content identifies at least one portion of the notification content for obfuscation, the method further comprising:
   subsequently determining, by the computing device, second notification content comprising at least a portion of the second event content from a second application event;
   applying the selected filter criteria to the second notification content to identify portions of the notification content for obfuscation; and
   generating second filtered notification content by obfuscating any identified portions of the notification content;
   wherein the application of the selected filter criteria to the second notification content does not identify any portions for obfuscation, such that the second filtered notification content includes the second notification content itself, without alteration.

6. The method of claim 1, wherein a first portion of the notification event is identified for obfuscation, and wherein obfuscating any identified portions of the notification content comprises removing the first portion, altering the first portion, or substituting alternate content for the first portion.

7. The method of claim 1, wherein the notification content comprises text, and wherein applying the selected filter criteria comprises:
applying a plurality of entity annotators to the text to generate annotations for each of a plurality of portions of the text, wherein each annotation specifies a type for the corresponding portion of the text, wherein the type is selected from a set of types; and
using the selected filter criteria to analyze each annotation and determine whether or not the corresponding portion of the text should be obfuscated in the filtered notification content.

8. The method of claim 1, wherein the notification content comprises text, and wherein the selected filter criteria comprise one or more of the following criteria: (a) filter criteria for identifying names of individuals, (b) filter criteria for identifying information indicative of an intended recipient's schedule, and (c) filter criteria for identifying contact information.

9. The method of claim 1, wherein the notification content comprises image data, and wherein applying the selected filter criteria comprises:
applying one or more image filter criteria to the image data to identify portions of the image data for obfuscation; and
generating the filtered notification content by removing or visually altering any identified portions of the image data.

10. The method of claim 9, wherein the one or more image filter criteria comprise one or more of the following criteria: (a) facial-recognition-based filter criteria, and (b) image filter criteria for places or objects associated with the user-account.

11. The method of claim 1, further comprising, before applying the selected filter criteria:
determining a context associated with subsequent display of the filtered notification content;
selecting one of a plurality of obfuscation levels based on the determined context; and
selecting the filter criteria to be applied to the notification content based on the selected obfuscation level.

12. The method of claim 1, wherein the filtered notification content combines the non-obfuscated portion of the event content and the obfuscated portion of the event content, such that when viewed by an intended recipient, the filtered notification content provides implicit information related to the application event, the method further comprising:
receiving input data associated with the display of the filtered notification content;
analyzing the input data to determine whether or not the implicit information was understood by the intended recipient; and
adjusting an obfuscation level of the selected filter criteria based on whether or not the implicit information was actually understood by the intended recipient.

13. The method of claim 1, wherein the computing device comprises the graphic display on which the notification comprising the filtered notification content is displayed.

14. A computing device comprising:
a graphic display;
a processor; and
program instructions stored on a non-transitory computer-readable medium and executable by the processor to:
cause the computing device to operate in a restricted-access mode;
during operation in the restricted-access mode, receive an indication of an application event comprising event content, wherein the application event is associated with an intended recipient having a user-account;
in response to the indication of the application event, determine notification content comprising at least a portion of the event content;
based at least in part on data from the user-account of the intended recipient, select filter criteria that is applicable to notification content to obfuscate a portion of the notification content, such that when resulting filtered notification content is viewed by the intended recipient, the resulting filtered notification content implicitly indicates the obfuscated portion to the intended recipient;
apply the selected filter criteria to the notification content to identify portions of the notification content for obfuscation;
generate filtered notification content by obfuscating at least one identified portion of the notification content, such that the filtered notification content comprises a non-obfuscated portion of the notification content and an obfuscated portion of the notification content, and implicitly indicates the obfuscated portion when viewed by the intended recipient; and
during operation in the restricted-access mode, cause the graphic display to display an unrestricted notification comprising the filtered notification content.

15. The computing device of claim 14, wherein the restricted-access mode comprises a locked mode.

16. The computing device of claim 14, wherein the filtered notification content combines the non-obfuscated portion of the event content and the obfuscated portion of the event content, such that when viewed by an intended viewer, the filtered notification content provides implicit information related to the application event.

17. A computer-implemented method comprising:
while a first computing device is operating in a restricted-access mode, receiving, by a second computing device, an indication of an application event comprising event content, wherein the application event corresponds to an application of the first computing device, and wherein the application event is associated with an intended recipient having a user-account;
in response to the indication of the application event, determining, by the second computing device, notification content comprising at least a portion of the event content;
based at least in part on data from the user-account of the intended recipient, selecting, by the second computing device, filter criteria that is applicable to notification content to obfuscate a portion of the notification content, such that when resulting filtered notification content is viewed by the intended recipient, the resulting filtered notification content implicitly indicates the obfuscated portion to the intended recipient;
applying, by the second computing device, the selected filter criteria to the notification content to identify portions of the notification content for obfuscation;

generating, by the second computing device, filtered notification content in which at least one identified portion of the notification content is obfuscated, such that the filtered notification content comprises a non-obfuscated portion of the notification content and an obfuscated portion of the notification content, and implicitly indicates the obfuscated portion when viewed by the intended recipient; and while the first computing device is still operating in the restricted-access mode, causing a graphic display to display an unrestricted notification comprising the filtered notification content.

18. The method of claim 17, wherein the first and second computing device are the same computing device, and the graphic display is part of another computing device, and wherein causing the graphic display to display the notification comprising the filtered notification content comprises:

sending a message from the second computing device to the other computing device, wherein the message provides the filtered notification content for display on the graphic display of the other computing device.

19. The method of claim 17, wherein the second computing device is a server computing system, wherein the graphic display is part of a third computing device, and wherein causing the graphic display to display the notification comprising the filtered notification content comprises:

sending a message from the server computing system to the third computing device, wherein the message provides the filtered notification content for display on the graphic display of the third computing device.

20. The method of claim 19, wherein the first and third computing devices comprise two different end-user devices associated with a common user-account.

21. The method of claim 17, wherein the filtered notification content combines the non-obfuscated portion of the event content and the obfuscated portion of the event content, such that when viewed by an intended viewer, the filtered notification content provides implicit information related to the application event.

* * * * *